United States Patent
Risinger

[11] Patent Number: 5,855,087
[45] Date of Patent: Jan. 5, 1999

[54] FISHING ROD HOLDER

[76] Inventor: Kenneth Risinger, 919 S. Placita Guarina, Green Valley, Ariz. 85614

[21] Appl. No.: 616,314

[22] Filed: Mar. 15, 1996

Related U.S. Application Data

[63] Continuation-in-part of Ser. No. 415,471, Jun. 12, 1995, abandoned.

[51] Int. Cl.$^6$ ................................. A01K 97/10
[52] U.S. Cl. .......................... 43/21.2; 248/514; 248/910
[58] Field of Search .................... 43/21.2, 54.1; 248/514, 519, 520, 910, 291.1

[56] References Cited

U.S. PATENT DOCUMENTS

| | | | |
|---|---|---|---|
| 1,523,223 | 1/1925 | Leonardos | 248/514 |
| 1,856,000 | 4/1932 | Smith | 248/519 |
| 2,596,403 | 5/1952 | Hoffman | 248/519 |
| 3,327,978 | 6/1967 | Gates | 248/520 |
| 3,555,719 | 1/1971 | Butler | 43/54.1 |
| 3,603,019 | 9/1971 | Smeltzer | 43/54.5 |
| 3,659,369 | 5/1972 | Hermanson | 43/21.2 |
| 3,667,708 | 6/1972 | Smeltzer | 248/39 |
| 4,014,128 | 3/1977 | Hrdlicka | 43/54.1 |
| 4,017,998 | 4/1977 | Dumler | 43/21.2 |
| 4,095,364 | 6/1978 | Prine | 43/54.1 |
| 4,106,811 | 8/1978 | Hernandez | 297/193 |
| 4,845,881 | 7/1989 | Ward | 43/21.2 |
| 5,131,179 | 7/1992 | McEwen | 43/54.1 |
| 5,209,009 | 5/1993 | Fast | 43/54.1 |
| 5,248,140 | 9/1993 | Matherne et al. | 248/519 |
| 5,259,612 | 11/1993 | Matherne et al. | 248/514 |
| 5,305,542 | 4/1994 | Phelps | 43/21.2 |
| 5,331,761 | 7/1994 | Kuthy | 43/21.2 |
| 5,335,440 | 8/1994 | Williams | 43/21.2 |
| 5,438,789 | 8/1995 | Emory | 248/514 |
| 5,460,353 | 10/1995 | Rittenhouse | 248/519 |
| 5,471,779 | 12/1995 | Downey | 43/54.1 |

*Primary Examiner*—Michael J. Carone
*Assistant Examiner*—Darren Ark
*Attorney, Agent, or Firm*—Antonio R. Durando

[57] ABSTRACT

A fishing device includes a rectangular container having an upper surface which is provided with a handle for carrying the container. A fishing rod holder is pivotally mounted on the upper container surface as is an adjusting arm for fixing the holder in different positions. The container is formed with a filler opening which serves for the introduction of a weighting substance into the container so that the container can function as an anchor for a fishing rod in the fishing rod holder. The filler opening can be closed by a cap.

1 Claim, 2 Drawing Sheets

FISHING ROD HOLDER

CROSS-REFERENCE TO RELATED APPLICATION

This application is a continuation-in-part of U.S. patent application Ser. No. 08/415,471 filed 12 Jun. 1995 abandoned by Kenneth Risinger et al. for "Portable Fishing Rod Holder".

BACKGROUND OF THE INVENTION

1. Field of the Invention

The invention relates to a device for holding a fishing rod.

2. Description of the Prior Art

Fishermen frequently wish to fish without holding a fishing rod in their hands. This may be due to fatigue or the desire to pursue another activity. In order to free themselves from the task of holding a fishing rod, fishermen originally impaled their fishing rods in the ground or braced their fishing rods with rocks or in the crevices of docks. More recently, however, fishing rod holders have been developed.

U.S. Pat. No. 3,603,019 teaches a fishing bucket containing a storage compartment. The bucket is provided with a padded cover which serves as a seat for a fisherman. Pipe sections are rigidly mounted on the side of the bucket and are designed to hold a fishing rod and a flashlight.

A similar bucket is taught by U.S. Pat. No. 3,667,708. However, the pipe sections are here pivotable.

U.S. Pat. No. 3,659,369 discloses a fishing rod holder comprising a frame which can be hung on a minnow container. Bracket arms extend from the frame and are adapted to support a fishing rod.

U.S. Pat. No. 4,017,998 illustrates a fishing rod holder which again includes a frame. The frame can be secured to a boat or another object and carries a tubular socket which receives the handle of a fishing rod.

U.S. Pat. No. 4,106,811 shows a collapsible apparatus including a seat which can be attached to a container. Support members for a fishing rod are adjustably connected to the seat.

U.S. Pat. No. 5,305,542 teaches a bait container having a manual air pump for aerating the bait. Clamps are mounted on the side of the container and function to hold fishing rods for transport and storage.

U.S. Pat. No. 5,209,009 discloses a fishing rod holder comprising a plate and a fishing rod receptacle on one side of the plate. The opposite side of the plate is provided with means for connecting the plate to a side wall of a tackle box.

U.S. Pat. No. 5,331,761 illustrates a tackle box with one or more fishing rod holders in the form of pipes extending upwards at an angle from the lid of the box.

U.S. Pat. No. 5,335,440 shows a fishing rod holder having a pair of parallel legs which are spaced from one another by a distance sufficient to receive the handle of a fishing rod. A first U-shaped member is disposed at a first end of the legs and a second U-shaped member is disposed at a second end of the legs. The U-shaped members extend perpendicular to the legs in opposite directions and serve to fix a fishing rod in a predetermined position. Coupling elements on one of the legs allow the holder to be attached to a bucket.

Finally, U.S. Pat. No. 5,471,779 teaches a fishing apparatus including a chest for storing live bait. The chest has a lid which constitutes a seat. Mounted on the side of the chest are an aerator for the bait, a storage compartment for fishing accessories, and a fishing rod holder.

None of the devices described above is entirely convenient. Thus, where a fishing rod holder is mounted on the side of a chest or bucket, the holder can snag when the bucket or chest is being carried. If such a fishing rod holder is detachable from the chest or bucket, removal of the holder for carrying involves extra work and time. On the other hand, a fishing rod holder attached to the top of a tackle box requires removal of the fishing rod if the box needs to be opened while fishing.

SUMMARY OF THE INVENTION

It is an object of the invention to provide a fishing device which enables a fisherman to carry a fishing rod holder with relative ease.

Another object of the invention is to provide a fishing device which allows a fisherman to carry a fishing rod holder with relatively little risk of snagging.

An additional object of the invention is to provide a method which makes it possible to achieve greater convenience for a fisherman.

The preceding objects, as well as others which will become apparent as the description proceeds, are achieved by the invention.

One aspect of the invention resides in a fishing device. The device comprises wall means defining a chamber which is bounded on all sides by the wall means. The wall means, which is provided with a filler opening for a weighting substance, includes a top wall section. A carrying handle, as well as an adjustable fishing rod holder, are mounted on the top wall section.

Since both the fishing rod holder and the carrying handle are mounted on the top wall section, the chances of snagging are reduced as compared to a holder located on the side. Furthermore, this arrangement makes it easy to carry the fishing device.

The chamber in the fishing device of the invention is fillable with a weighting or ballasting substance in order to provide good anchorage for a fishing rod. The chamber can be filled and emptied at the location of use so as to facilitate transport of the fishing device.

Additional features and advantages of the invention will be forthcoming from the following detailed description of preferred embodiments when read in conjunction with the accompanying drawings.

DESCRIPTION OF THE PREFERRED EMBODIMENTS

Figure 1:
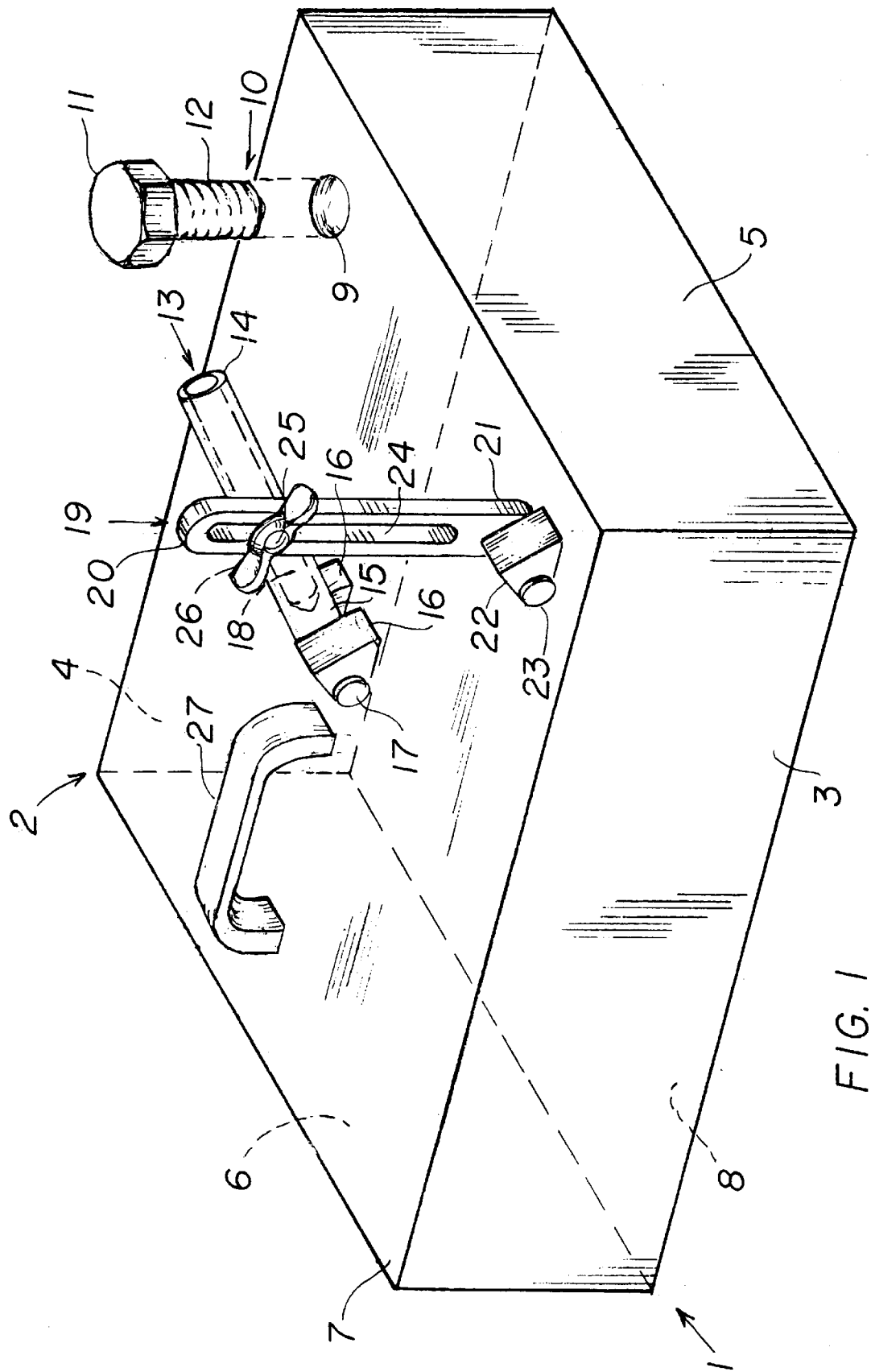
FIG. 1 is a perspective view of one embodiment of a fishing device according to the invention.

Referring to FIG. 1, a fishing device according to the invention is identified generally by the numeral 1. The fishing device 1 includes a rectangular container 2 made up of a front wall or front wall section 3, a rear wall or rear wall section 4, two end walls or end wall sections 5 and 6, a top wall or top wall section 7, and a bottom wall or bottom wall section 8. The front wall 3 is parallel to the rear wall 4, the end wall 5 is parallel to the end wall 6, and the top wall 7 is parallel to the bottom wall 8. Furthermore, the front wall 3 and rear wall 4 are perpendicular to the top wall 7, the bottom wall 8 and the end walls 5,6. The walls 3–8 define a chamber which is bounded on all sides by the walls 3–8. With the exception of an opening 9 in the top wall 7, the walls 3–8 entirely enclose the chamber. The opening 9 serves as a filler opening for the introduction of a weighting or ballasting substance into the chamber.

A cap or closure 10 is provided for the opening 9. The cap 10 has a head 11 and an externally threaded shank 12. The opening 9 is likewise threaded, and the threads on the shank 12 are designed to mesh with the threads in the opening 9 so that the cap 10 can be screwed into the opening 9.

A fishing rod holder is disposed on the top wall 7 of the container 2 and comprises an elongated cylinder or cylindrical element 13 of circular cross section. The cylinder 13 has an upper end 14 as well as a lower end 15 which is pivotally mounted on two bearings or bearing elements 16 rigid with the top wall 7. The bearings 16 are spaced from one another by a gap large enough to receive the lower cylinder end 15, and the lower cylinder end 15 extends into such gap. A pivot 17 passes through the bearings 16 and the lower cylinder end 15. The pivot 17 can, for instance, be constituted by a threaded bolt or screw which is held in place by a nut.

The cylinder 13 is provided with an elongated passage in the form of a blind bore 18. The bore 18 extends between the upper cylinder end 14 and a location somewhat above the bearings 16. The bore 18, which opens to the upper cylinder end 14, is circular in cross section and is sized to receive a fishing rod handle.

An elongated adjusting arm or adjusting element 19 is further disposed on the top wall 7 of the container 2. The adjusting arm 19 has an upper end 20 as well as a lower end 21 which is pivotally mounted on a bearing or bearing element 22 rigid with the top wall 7. A pivot 23 passes through the bearing 22 and the lower arm end 21. The pivot 23 can, for example, be in the form of a threaded bolt or screw which is held in place by a nut. The adjusting arm 19 is preferably constituted by a flat metallic bar.

The adjusting arm 19 is provided with an elongated slot 24 which passes through the thickness of the adjusting arm 19. The slot 24 extends from the region of the upper arm end 20 to a location somewhat above the bearing 22.

An externally threaded rod or rod-like element 25 projects from the side of the cylinder 13 through the slot 24. The rod 25 is sized so that it can slide along the slot 24 to thereby change the inclination of the cylinder 13 relative to the top wall 7 of the container 2. A locking element, which is here shown as a wing nut 26, is threaded onto the rod 25 on that side of the adjusting arm 19 remote from the cylinder 13. When the cylinder 13 has been moved to the desired inclination, the wing nut 26 is tightened to lock the cylinder 13 at this inclination. The rod 25 can, for instance, be constituted by the shank of a screw or bolt.

A handle 27 for carrying the fishing device 1 is also disposed on the top wall 7 of the container 2 and is rigid with the top wall 7.

The container 2, the cap 10, the cylinder 13, the bearings 16 and 22, and the handle 27 are preferably made of lightweight plastic. By way of example, the container 2, the bearings 16 and 22, and the handle 27 can be made of high density polyethylene.

The corners of the container 2 are advantageously rounded. It is further preferred for the cylinder 13 to be off-center with respect to the end walls 5 and 6 and, in the illustrated embodiment, the cylinder 13 is located nearer the end wall 5 than the end wall 6. Such an arrangement inhibits tipping of the fishing device 1 when a fish pulls on the line.

The operation of the fishing device 1 will be described assuming that the container 2 is empty and a fisherman is about to carry the fishing device 1 to a fishing area.

The fisherman grasps the handle 27 of the fishing device 1 to lift the latter and then proceeds to walk to the fishing area. Upon reaching the fishing area, the fisherman sets down the fishing device 1 and removes the cap 10 from the filler opening 9. The fisherman then fills the container 2 with water via the filler opening 9. Once the container 2 has been filled, the cap 10 is reinserted in the filler opening 9 to seal the same. The fisherman now lifts the container 2 by the handle 27 and moves the container 2 to the location from which the fisherman wishes to fish. This location can be on the shore, on a dock or pier, or on a boat.

After the filled container 2 has been placed at the desired fishing location, the fisherman casts out the line of a fishing rod and thereafter pushes the fishing rod handle into the cylinder 13. The fisherman then lets go of the fishing rod and proceeds to fish without holding the fishing rod in the hands. If the fisherman wishes to change the inclination of the fishing rod, the fisherman loosens the wing nut 26 and slides the rod 25 of the cylinder 13 along the slot 24 of the adjusting arm 19 until the desired inclination has been achieved. The fisherman thereupon tightens the wing nut 26 to fix the cylinder 13 at such inclination.

When a fish pulls on the line of the fishing rod, the body of water in the container 2 will normally prevent the fish from moving the fishing device 1.

Once the fisherman has finished fishing, the fisherman pulls the fishing rod out of the cylinder 13. The fisherman subsequently removes the cap 10 from the filler opening 9 and turns the container 2 upside down to empty the water from the container 2 via the filler opening 9. After the container 2 has been emptied, the fisherman reinserts the cap 10 in the filler opening 9 and grasps the handle 27 to carry the fishing device 1 away from the fishing area.

Figure 2:
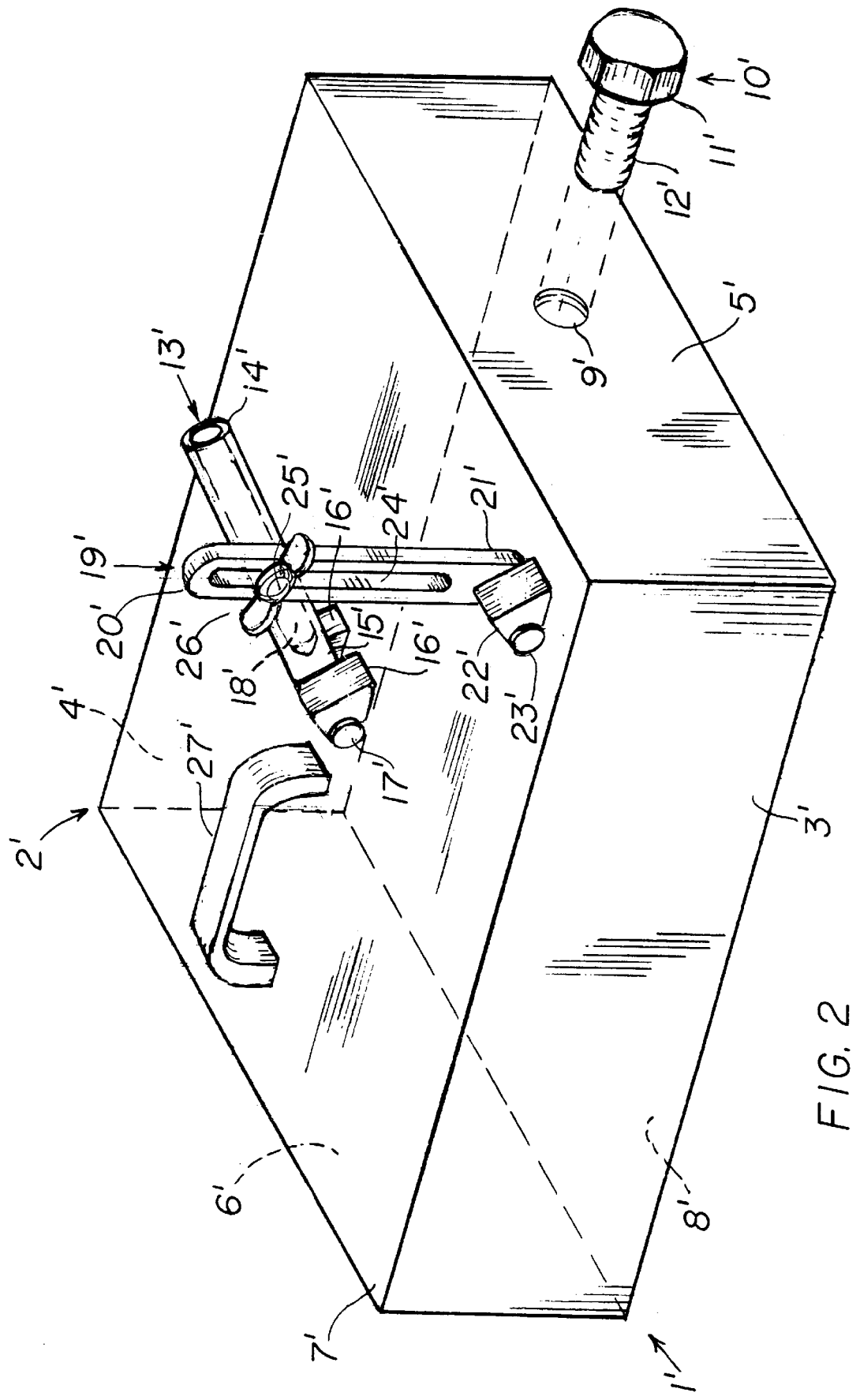
FIG. 2 is a perspective view of another embodiment of a fishing device in accordance with the invention.

FIG. 2 illustrates another embodiment of a fishing device according to the invention. In FIG. 2, the same reference numerals as in FIG. 1, but with primes, are used to identify corresponding elements.

The fishing device 1' of FIG. 2 differs from the fishing device 1 of FIG. 1 only in that the filler opening 9' of the fishing device 1' is provided in the end wall 5' rather than the top wall 7'.

The fishing device 1,1' is designed to be manually portable so that it can be readily carried to a fishing area and also moved from one location to another within the fishing area. Furthermore, the fishing device 1,1' can be set down on virtually any surface and in virtually any type of terrain.

Due to the placement of the cylinder 13,13' and the adjusting arm 19,19' on the top surface of the container 2,2' together with the handle 27,27', there is little likelihood of the cylinder 13,13' and/or the adjusting arm 19,19' snagging on an object while the fishing device 1,1' is being carried. Moreover, such an arrangement allows the fishing device 1,1' to be carried conveniently.

The use of threaded bolts or screws, and mating nuts, as hinges for the cylinder 13,13' and the adjusting arm 19,19' enables the cylinder 13,13' and the adjusting arm 19,19' to be readily disconnected from the container 2,2'. This permits the cylinder 13,13' and the adjusting arm 19,19' to be replaced easily and makes it possible to reduce the storage space required for the fishing device 1,1'.

The container 2,2' of the fishing device 1,1' allows the fishing device 1,1' to serve as a ballast or weight for holding a fishing rod in place. While water is preferably employed as a weighting or ballasting substance in the container 2,2', it is possible to use sand, dirt, pebbles or rocks in the event that water is not accessible.

The cylinder 13,13' can be designed to accommodate any fishing rod handle or hand grip including the pistol-grip type.

Various modifications can be made within the meaning and range of equivalence of the appended claims.

I claim:

1. A fishing device comprising:

wall means defining a chamber which is bounded on all sides by said wall means, said wall means being of one piece and including a top wall section, and said wall means being provided with a filler opening for a weighting substance, said filler opening passing through said wall means, and said filler opening constituting the sole access to said chamber and being so small as to prevent the hand of a user from passing therethrough;

a closure for said filler opening, said closure having a sealing position in which said closure substantially completely seals said filler opening against the passage of water through said filler opening, and said chamber being substantially watertight when said closure is in said sealing position;

a carrying handle projecting upward from and rigidly connected with said top wall section;

an adjustable fishing rod holder mounted on said top wall section, said fishing rod holder including at least one elongated member having a first end which is pivotally connected to said top wall section and a second end remote from said first end, and said at least one elongated member being provided with a passage for a fishing rod, said passage being open at said second end and extending from said second end towards said first end, and said passage terminating at a location between said ends and being sealed at said location; and means for arresting said at least one elongated member in any one of a multiplicity of positions, said arresting means including an additional elongated member pivotally mounted on said top wall section, a slot in one of said at least one elongated member and said additional elongated member, and a projection on the other of said at least one elongated member and said additional elongated member, said slot extending longitudinally of said at least one elongated member or said additional elongated member, and said projection being receivable in said slot and being movable along said slot longitudinally of said at least one elongated member or said additional elongated member.

\* \* \* \* \*